United States Patent [19]

Strauch

[11] 4,358,763
[45] Nov. 9, 1982

[54] CONTINUOUS-WAVE RADAR RESPONDER HAVING TWO-POSITION SWITCHES

[75] Inventor: Raymond Strauch, Viroflay, France

[73] Assignee: U.S. Philips Corporation, New York, N.Y.

[21] Appl. No.: 148,116

[22] Filed: May 9, 1980

[30] Foreign Application Priority Data

May 16, 1979 [FR] France .................. 79 12479

[51] Int. Cl.³ .............................................. G01S 13/80
[52] U.S. Cl. ...................................... 343/55 W; 455/7;
455/19; 343/6.8 R
[58] Field of Search ........... 343/5 SW, 6.8 R, 6.8 LC;
455/7, 19; 330/75, 112

[56] References Cited

U.S. PATENT DOCUMENTS

| | | | |
|---|---|---|---|
| 2,957,050 | 10/1960 | Barton | 330/112 X |
| 2,986,707 | 5/1961 | Blecher | 330/112 X |
| 3,617,913 | 11/1971 | Schmidhauser | 330/75 X |
| 3,685,050 | 8/1972 | Cartwright | 343/6.8 R X |
| 4,072,949 | 2/1978 | Van Brunt | 343/18 E |
| 4,151,525 | 4/1979 | Strauch et al. | 343/55 W X |

*Primary Examiner*—Malcolm F. Hubler
*Attorney, Agent, or Firm*—Robert J. Kraus

[57] ABSTRACT

The invention relates to C-W radar responders, having a carrier of some gigahertz whose amplitude is modulated between some dozens and some hundreds of kilohertz. Such a responder comprises means for sampling the signal it receives in such a manner that the sampling theorem is satisfied with respect to the amplitude-modulation frequency. The responder comprises at least an aerial, a radio-frequency amplifier, a delay line, a clock generator, an input, an output and two switches connected to the input and to the output, respectively, of the amplifier. The operating sequence of the switches, controlled by the clock generator, is such that each sample of the received signal passes through the amplifier more than once before it is re-transmitted.

8 Claims, 7 Drawing Figures

CONTINUOUS-WAVE RADAR RESPONDER HAVING TWO-POSITION SWITCHES

BACKGROUND OF THE INVENTION

The invention relates to a C-W radar responder, which receives a frequency and amplitude-modulated carrier whose average frequency is equal to some gigahertz. The responder comprises means for sampling the received carrier at a frequency which is at least equal to double the amplitude-modulation frequency, which is located between some dozens and some hundreds of kilohertz. The responder also comprises an aerial, an amplifier, a delay line having a time delay, at least a first switch having two positions, which acts as the sampling device, a clock generator, an input and an output.

Responders or beacons, beacons being defined as ground-based responders, are usually used to amplify an echo detected by a radar system and for the identification of aircraft detected by the radar system. Such responders may, for example, in conjunction with distance measuring equipment of the radio altimeter type on board helicopters be of assistance during flying in formation. When the responder is a beacon and a radio altimeter is provided on board the helicopter, the responder functions to help, for example, during landing or during navigation of the helicopter with a range up to some dozens of kilometers. The identification of the responder may, for example, be done by means of an amplitude modulator or a single-sideband modulator associated with the responder.

When a responder is used in relation with a C-W ("continuous-wave") radar transmitter, for example a radio altimeter of the type described in French Patent specification No. 1,557,670, (corresponding to U.S. Pat. No. 3,588,899) which can transmit a carrier with a frequency of several gigahertz, it is necessary to maintain a certain phase relationship between the received carrier and the re-transmitted carrier, so that in the radar transmitter the phases of the signals transmitted by the radar and the signals which are re-transmitted by the responder can be compared.

For the case of a C-W radar responder it is not necessary to use an amplifier directly. It is possible to change to a lower intermediate frequency, to amplify at that lower intermediate frequency and to re-transmit with a frequency which may be the frequency of the carrier received by the responder, or a different frequency. Whatever the case, the carriers received by the responder and re-transmitted by it are then of the same nature, that is to say all components of the signal are retained. With the very high frequency amplifiers of present day technology the change to a lower intermediate frequency can be avoided, and direct amplification is possible. The invention relates more particularly to this type of amplification, which will be included by way of non-limitative example in the description given hereinafter.

For the preferred uses, described within the scope of the invention and in order to have a basis for comparison with the prior art, the powers to be re-transmitted are, for example, on the order of some milliwatts and correspond to a minimum gain between the received and the re-transmitted carriers, which may be over 80 dB. In addition, in certain applications, an address which may be the responder address, is inserted by a modulator and superimposed on the re-transmitted signal, for example, in the form of a frequency shift of a predetermined value.

The simplest circuit diagram of the known C-W responder comprises an amplifier, whose input is connected to a receiving aerial and the output to a transmitting aerial. Such an arrangement is not suitable for the considered uses, as the unavoidable couplings between the two aerials would make the system unstable, unless one is satisfied with a very low gain to the order of, for example, 30 dB. The necessary decoupling between the two aerials must exceed 80 dB for the applications considered here. Such decoupling is difficult to realize, both for a ground-based beacon, because of the parasitic carriers reflected from the soil, (Larsen effect), and for a responder installed on board an aircraft, because it is difficult to space the two aerials sufficiently apart.

It may be desirable to have only one aerial instead of two, for example in the case where it is necessary to realize a difficult, accurate angular adjustment, or in the case where only little space is available on board an aircraft. In that case, one could use in known manner one receiving signal aerial and a circulator, which connects the aerial to the input and to the output of the amplifier. In such a responder, the decoupling problems are still more critical than in the case described in the preceding paragraph, as it is practically impossible to avoid a reflection which has a certain standing wave ratio, and it is difficult to get a standing wave ratio below 1.2, which corresponds to only 1% of the reflected energy, that is to say a decoupling less than 20 dB. It would therefore be necessary to use an amplifier having a gain factor less than 20 dB, which is insufficient.

In another prior art type of a responder, a portion of the received carrier is amplified, stored in a delay-line and re-transmitted with a predetermined frequency, after having been amplified for the second time. Such a responder comprises the cascade arrangement of a first amplifier, whose first stage is also used to filter the signal, a delay line, a modulator which determines the predetermined frequency, and a second amplifier. By means of a two-position switch a first terminal of which is connected to a transmit-receive aerial, the aerial can be connected to the input or to the output of the responder, either in the receive position or in the position for the re-transmission. The combined use of a delay line and a two-position switch effects an efficient decoupling between the received signal and the re-transmitted signal, because of their displacement in time, and enables an amplification between these two signals which can be more than 80 dB. This advantage is the result of the fact that the received wave is sampled by the two-position switch, which acts as a sampling device, as a clock generator consisting of a control circuit connected to an oscillator controls the change-over of the switch from the one to the other position at a constant predetermined rate Fd. Such sampling, is not a serious drawback, provided that the relationship between the received signal and the re-transmitted signal can be maintained in accordance with the sampling theorem, alteratively called the Shannon formula. This is accomplished if sampling is done at a rate Fd, which is at least equal to double the maximum amplitude modulation frequency of the signal received by the responder. When this requirement is satisfied, which, as explained above, is rather easy, such a responder is denoted a pseudo C-W responder. In the category of C-W responders the invention relates more particularly to this type of pseudo C-W responder in which a clock generator determines both the sampling frequency and the cycle ratio, that is to say the ratio between the receiving period and the total period Td, which is equal to the inverse of the sampling rate Fd. The clock generator is independent, that it is say, it does not require any synchronisation with respect to any other signal. A pseudo C-W responder of this art is described in, for example, French patent specification no. 2,343,258, (corresponding to U.S. Pat. No. 4,151,552) with reference to the FIGS. 9 and 10 of that specification.

SUMMARY OF THE INVENTION

The present invention has for its object to reduce the costs of a responder of the type defined in the opening paragraph, which object is accomplished in that the amplifier elements are reduced by substantially 50%.

A further object of the invention is to improve the decoupling between the received signal and the re-transmitted signal and to render an increase in the gain factor of the responder possible thus.

A still further object is to improve the filtration of the signal to be re-transmitted.

According to the invention these objects are accomplished by providing a responder of the type, defined in the opening paragraph which further comprises at least a second two-position switch. Each of the switches has a first terminal which is connected to the input and to the output, respectively, of the amplifier, The operating sequence of the switches is controlled by the clock generator such that each sample of the received signal passes at least a first time through the amplifier, a first time through the delay line, and a second time with an input level which is higher than the input level of the first passage, through the amplifier.

The invention makes advantageous use of the delay line, which is already required to sample the received signal, to have each sample of the signal circulate at least twice through a sole amplifier, so that the gain of this amplifier can be reduced to approximately 50%, the results remaining the same as compared with prior art responders, as described above.

In accordance with a first embodiment, the responder according to the invention comprises a receiving aerial and a transmitting aerial, which are connected to a second terminal of the first two-position switch and to a third terminal of the second two-position switch, respectively. This embodiment is suitable for a responder beacon on the ground by means of which the aerials, without having been directed, have a radiation field which brings them substantially outside the reach of the echoes coming from the soil or from ground-based obstacles.

According to a second embodiment, the responder comprises a sole receiving-transmitting aerial which is connected to the first terminal of a third two-position switch by means of which the aerial is connected to either the second terminal of the first two-position switch or to the third terminal of the second two-position switch. Such a responder is suitable for use in a beacon on board an aircraft, for example a helicopter.

Depending on the sequence imposed by the clock generator on the switches, the received signal can pass either twice or three times through the amplifier, and once or twice through the delay line, respectively. A greater number of recirculations of the signal in the responder is neither desirable nor advantageous for the following reasons: in the first place when this number of recirculations is increased the value of the cycle ratio decreases, so that the gain coefficient of the amplifier must be increased to keep the average level of the re-transmitted signal substantially constant; in the second place, from the third passage through the delay line onward, the sample of the signal to be re-transmitted would be superimposed on the first parasitic echo formed in the delay line during the first passage of this sample, which would cause the signal to be re-transmitted to be disturbed by this echo.

The invention will now be further explained by way of non-limitative examples with reference to the accompanying drawing.

DESCRIPTION OF THE PREFERRED EMBODIMENTS

Figure 1:
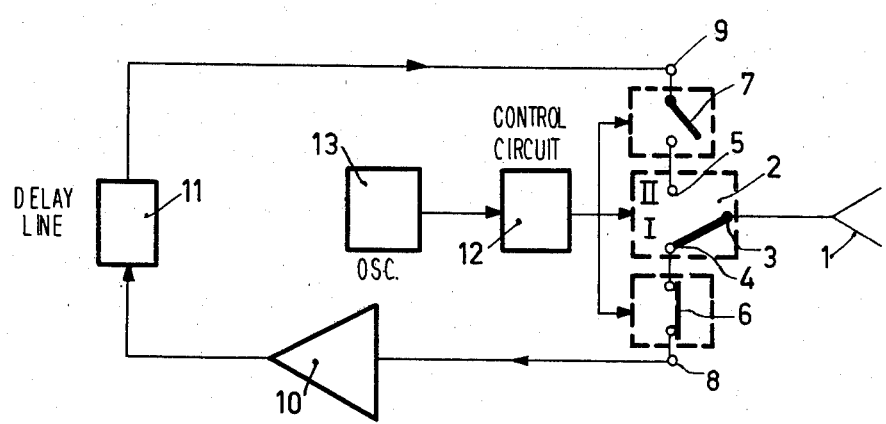
FIG. 1 is a block schematic diagram of a pseudo C-W responder of a known type.

FIG. 1 shows a prior art pseudo C-W responder comprising a receiving-transmitting aerial 1, which is connected to a first terminal 3 of a two-position switch 2. The two possible positions of the switch which connect the first terminal 3 to a second terminal 4 or to a third terminal 5, respectively, are indicated by I or II. Two interrupters 6 and 7 connect the terminals 4 and 5, respectively, to an input terminal 8 and to an output terminal 9 of the responder. Between the terminals 8 and 9 there is the cascade arrangement of amplifier 10, which can process r. f. signals on the order of some gigahertz, a delay line 11 which delays the received signal by a period of time on the order of one microsecond, and possibly a modulator, which is not shown in the drawing. The numerals 2, 6, 7 denote, for example, a switch and diode interrupters of a known type.

The alternate reception and re-transmission is controlled by the switch 2, which can assume either the one or the other of its two positions I and II, depending on the value of a control signal produced by control circuit 12, this control signal having a fixed frequency Fd, which is derived from a quartz oscillator 13 while the combination of the elements 12 and 13 forms a clock generator. The alternation between reception and re-transmission renders it possible to obtain a considerable gain without the risk for instability (on the condition, however, that this gain is not too great) seeing that the feedback loop is never closed. Opening of this loop is, if necessary, reinforced by the presence of the interrupters 6 and 7, the position shown in FIG. 1 of the elements 2, 6 and 7 corresponding with the receiving phase. The positions are reversed for re-transmission. In the receiving phase the signal is processed in the circuit which is comprised of the following cascaded elements: aerial 1, switch 2 in position I, interrupter 6 in the closed condition, amplifier 10, delay line 11, interrupter 7 in the open condition. As the approximate gain between the received carrier and the re-transmitted wave can be 80 dB and a normal, commercially available switch has been designed to ensure in general an isolation of only 50 dB, the presence of the interrupters 6 and 7 is, generally, necessary.

On the other hand, the very high frequency delay line 11, which enables sampling of the received carrier has an insertion loss causing an attenuation of the signal to the order of 40 dB. This means that the amplifier 10 must have a very high gain, to the order of 120 dB, which makes it very expensive, while it is utilized only a fraction of the time. The amplifier 10 comprises, for example, 12 stages, each stage producing a gain of 10 dB. Preferably, the amplifier is split in two sections which are positioned on both sides of the delay line 11 to avoid operation at powers which are too high. The portion of the amplifier preceding the delay line has been provided with, for example, 6 stages, including an input stage, which is also used to filter the signal. The other portion of the amplifier is also provided with 6 stages, one or more of which are output stages designed as power stages, which produce a signal at a power of some milliwatts.

Figure 2:
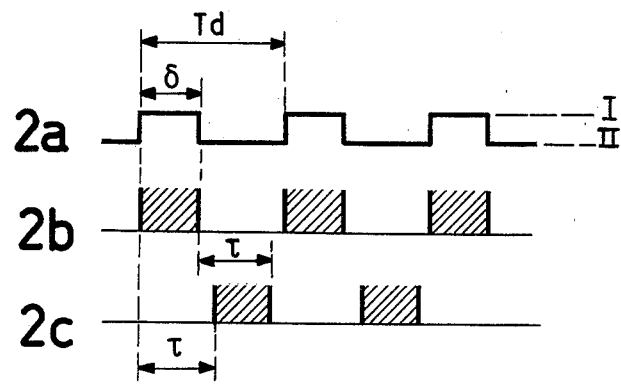
FIG. 2 is a time diagram illustrating the operation of the responder of FIG. 1.

The operation of this responder is illustrated by the diagrams shown in FIG. 2. The diagram 2a shows the shape of the control signal of the switch 2. This control signal, which has a frequency Fd, has two levels I and II, which correspond to the positions I and II of the switch, the situation being that in each period $Td = 1/Fd$ the duration of II $(Td - \delta)$ is at least equal to the duration of I $(\delta)$. The diagram 2b shows by means of hatched zones the time intervals in which the signal received by the aerial 1 is applied to the delay line 11. Diagram 2c shows the time intervals in which the received signal appears at the output of delay line 11. The delay $\tau$ of the delay line is such that the delayed received signal occurs within the time intervals in which the switch 2 is in the position II. It is clear that then the aerial 1 of the responder re-transmits the entire signal, which was delayed for a period $\tau$. It should be noted that, to move from the position I to the position II, a switching period of approximately 50 ns is required. In these circumstances, when, for example, $\tau = 1$ μs, the receiving phase has a duration of, for example, $\tau = 0,95$ μs. It should also be noted that sampling of the input signal produces side bands, but that the coherence of the re-transmitted signal, i.e. the ability to demodulate this signal, is retained on the condition that the frequency Fd is at least equal to double the modulation frequency (sampling theorem).

When the re-transmission of the signal sample has ended, for example a time $\tau$ after the elements 2, 6, 7 were adjusted to the re-transmission position (see FIG. 2), a certain period of time, which is substantially equal to $Td - \tau - \delta$ (but for the switching periods) is then observed before the elements 2, 6 and 7 simultaneously return to the receiving position, all this being necessary to avoid parasitic reflection. In these circumstances the maximum obtainable value of the cycle ratio $\delta/Td$, is somewhat less than $\frac{1}{2}$. With the above-mentioned values for $\tau$ and for $\delta$, the maximum sampling frequency might be 500 kHz, which might render amplitude-modulation frequencies of up to approximately 200 kHz possible. The clock generator 12, 13, which is controllable to have, if necessary, the cycle ratio vary within limits permitted by the duration $\tau$, is independent and does not require any synchronization.

According to the invention, each sample of the received wave passes a first time through the amplifier, thereafter through the delay line and thereafter a second time through the amplifier.

Figure 3:
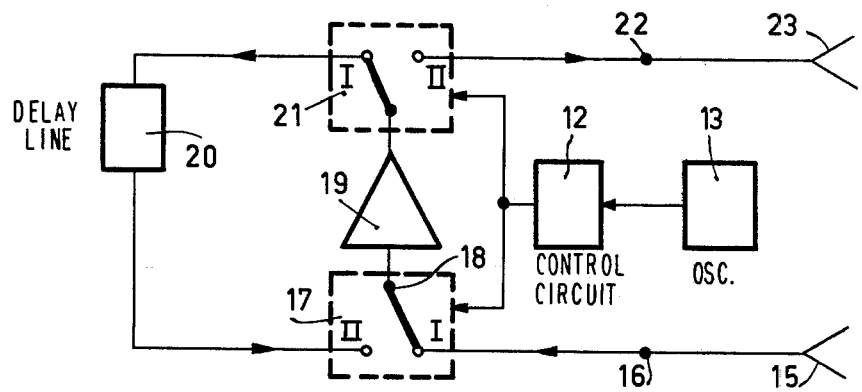
FIG. 3 is the block schematic diagram of a first embodiment of the invention comprising two aerials.

FIG. 3 show a first embodiment of the invention having two aerials. A receiving aerial 15 is connected to the input 16 of the responder. This input is connected to the second terminal of a first two-position switch 17, whose first terminal 18 is connected to the input of an amplifier 19. The third terminal of the switch 17 is connected to the output of a delay line 20. The output of the amplifier 19 is connected to the first terminal of a second two-position switch 21, whose second and third terminals are connected to the input of the delay line 20 and to the output 22 of the responder, respectively, the latter being connected to a transmitting aerial 23. The responder is shown in FIG. 3 in the receiving phase, while the switches 17 and 21 occupy their position I (electrical very high frequency connection between the first and the second terminal). In order to switch over to the re-transmission position, the two switches move simultaneously to the position denoted by II in FIG. 3, under the control of the clock generator 12, 13, which has the same function as in FIG. 1.

The sequence of operation of the switches under the control of the clock generator 12, 13 may comprise two phases, for each receiving- and re-transmission cycle, and may be identical to the sequence of operation described with reference to FIG. 2. The receiving phase has a duration $\delta$ which is somewhat shorter than $\tau$. The re-transmission phase, which in this case is also a recirculation phase of the signal through the amplifier 19, has a duration $Td-\delta$, which enables at least the transmission of the sample stored in the delay line, so this duration is at least equal to $\tau$. The predetermined maximum cycle ratio, which was equal to $\frac{1}{2}$ has consequently been retained. So the principle advantage of the invention consists in the use of an amplifier 19, whose gain G2 is derived from the gain G1 of the amplifier 10 of FIG. 1 by the formula: $G2 = \sqrt{G1}$.

The amplifiers 10 and 19 must process signals of the same strength, as the received and re-transmitted signals have the same strength in both cases. The amplifier 19 has, for example, 6 stages, each producing a gain of 10 dB, including an input stage for filtering purposes in order to reduce the noise, and an output power stage. This is very advantageous, as the amplifier is the most expensive element in a responder of the pseudo C-W type described with reference to the FIGS. 1 to 3 inclusive. The price of an amplifier such a 19, is almost half the price of an amplifier such as 10. The invention has the further advantage that, compared with the amplifier 10, the amplifier 19 is more often in operation, which improves the efficiency. In addition, if a still higher gain is required, that is to say more than 80 dB in the chosen numerical example, the circuit diagram of FIG. 3 is more suitable than that of FIG. 1, in which instable factors might appear and in which filtration of the signal would be difficult to realize.

Figure 4:
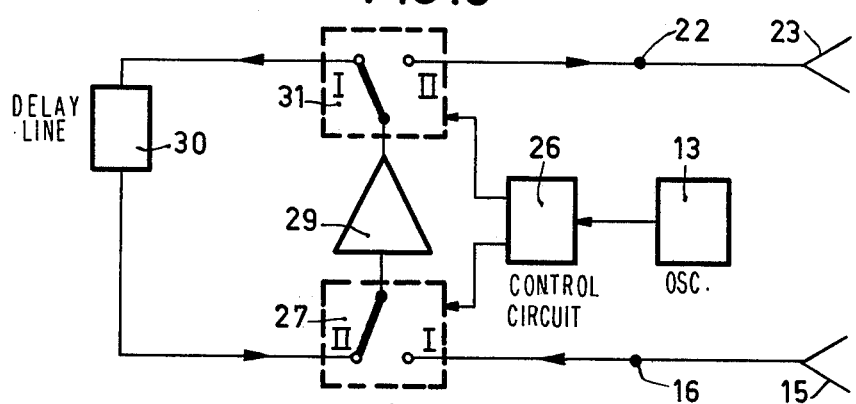
FIG. 4 is a variation of the embodiment of FIG. 3 for double recirculation of the signal sampled.

FIG. 4 shows a variation of the embodiment of FIG. 3, in which the sequence of operations comprises three phases for each receiving-and re-transmission cycle. The circuit diagram of FIG. 4 is almost the same as that of FIG. 3. However the output of the control circuit, having its operation illustrated in FIG. 5 by time diagrams, is different. This is reflected by different reference numerals for certain elements. For example, the first switch is 27, the amplifier is 29, the delay line is 30, the second switch is 31 and the control circuit is 26. The three-phase sequence of operations controlled by the clock generator 13, 26 is as follows, in accordance with the diagram of FIG. 5.

First phase: reception during a period of time δ which is somewhat shorter than τ. During this phase the two switches are in their position I. This phase ends when in 50 ns the switch 27 changes from position I to position II.

Second phase: recirculation during a period of time τ. Switch 27 is then in position II and switch 31 in position I. This phase ends when in 50 ns the switch 31 changes from position I to the position II. The drawing shows the responder in this second phase.

Third phase: recirculation and re-transmission during a period of time which is at least equal to τ. The two switches are in position II. This phase ends by the simultaneous change in 50 ns of the switches to their position I.

Figure 5:
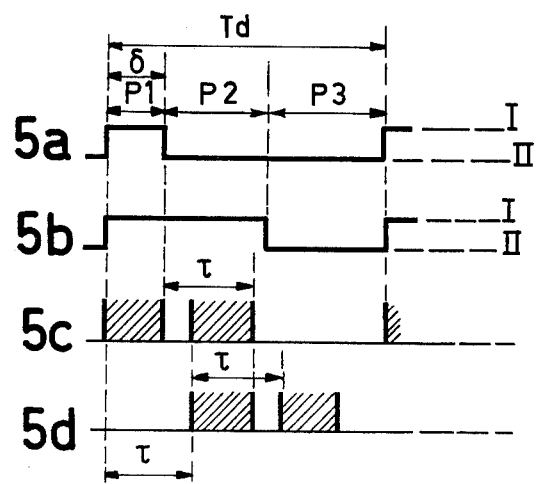
FIG. 5 is a time diagram illustrating the operation of the responder shown in FIG. 4.

FIG. 5 shows an operating cycle (duration Td):

5a shows the control signal of a first output of the control circuit 26, applied to the switch 27, 5b shows the control signal applied to the switch 31 by a second output of the control circuit 26, 5c shows, by means of hatched zones, the period of time in which the processed signal sample is transfered to the delay line 30, 5d shows, by means of hatched zones, the period of time during which the processed signal sample appears at the output of the delay line 30.

The three operating phases are shown in the drawing by P1, P2, P3, respectively.

It should be noted that during the second phase the main signal and the echo signal caused by the first passage of the signal circulate in the opposite direction in the delay line, which is not disturbing for the main signal. If a larger number of recirculations were required this would be disturbing for the main signal. In practice two recirculations should be the limit, because the accumulation of the insertion losses threatens to reduce the gain which is theoretically obtainable. The duration of the second phase is preferably at least equal to τ, so that the sample can be stored in its totality in the delay line during the second passage, prior to re-transmission. Assuming that a responder according to the invention has a gain of 100 dB, the amplifier 19 would have an amplification coefficient of 75 dB, while the amplifier 29 would have an amplification coefficient of only 65 dB. In the case illustrated in FIG. 4, the amplifier 29 functions three times per cycle and the problems of decoupling are still less critical than in the case of FIG. 5, because there is a loop gain time division into three instead of into two parts.

Figure 6:
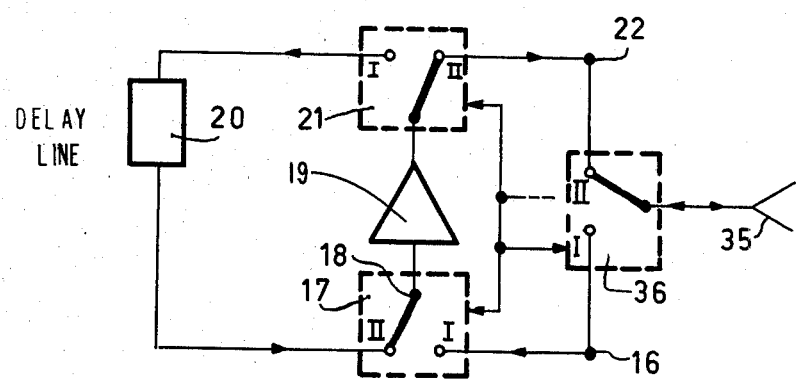
FIG. 6 is the block schematic diagram of a second embodiment of the invention comprising one sole aerial.

The block schematic circuit diagram of FIG. 6 shows a second embodiment of the invention. This recirculation responder comprises a sole transmitting-receiving aerial 35, which is connected to the first terminal of a switch 36, whose second and third terminals are connected to the input terminal 16 and to the output terminal 22, respectively. Between these input and output terminals the circuit diagram and operation of the responder are the same as those of the responder described with reference to FIG. 3. The clock generator is not shown in FIG. 6. This clock generator is identical to that of FIG. 3, its sole output also controls the switch 36, which is therefore in position I in the receiving phase and in position II in the re-transmission phase.

Figure 7:
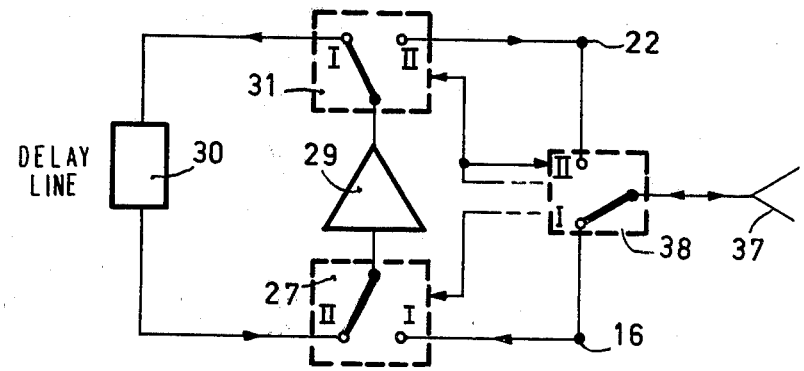
FIG. 7 is a variation of the embodiment shown in FIG. 6 for double recirculation of the signal sampled.

The responder whose block schematic circuit diagram is shown in FIG. 7 is a variation of the embodiment shown in FIG. 6. The sequence of operation for a receiving and re-transmission cycle includes three phases for this variation. This responder with double recirculation comprises a sole receiving-transmitting aerial 37, which is connected to the first terminal of a switch 38, whose second and third terminals are connected to the input terminal and to the output terminal 22, respectively.

The circuit diagram and operation of the responder between these input and output terminals are the same as those of the responder described with reference to the FIGS. 4 and 5. The clock generator is not shown in FIG. 7. This clock generator is identical to that shown in FIG. 4, one of its two outputs which, for example, controls switch 31, also controlling switch 38 which is therefore in the position I, at least during the receiving phase, and in position II, at least during the third phase of recirculation and re-transmission. The responder of FIG. 7 is shown as being in the second recirculation phase, in the case where the switch 38 is controlled by the same conductor as that which controls the switch 31.

The responders described with reference to the FIGS. 1, 3, 4, 6 and 7 are generally provided with a modulator. This modulator can insert the responder address, for example in the form of a frequency shift of the carrier with a predetermined characteristic value, into the processed signal.

In the circuit shown in FIG. 1 the demodulator, not shown, would preferably be arranged between the delay line 11 and the output terminal 9. In FIG. 3 it would be arranged between the delay line 20 and the switch 17. It should be noted, that the modulator would not operate at the same power level in these two responders. It is, however, easy to make these power levels equal, for example by arranging the modulator in FIG. 3 between the switch 21 and the output terminal 22 of the responder. In the responder shown in FIG. 4, the modulator must be arranged between the switch 31 and the output terminal 22 as in this responder the signal sample circulates twice in the recirculation loop and it is impossible to insert the modulator in this recirculation loop, unless it is designed such that it processes the signal twice instead of once for each sample. In view of the above explanations, the modulator would preferably be arranged between the delay line 20 and the switch 17 in FIG. 6 and between the switch 31 and the output terminal 22 in FIG. 7.

The general measure of the present invention is not restricted to the above-described embodiments. It may in particular be used for pulse-responder beacons which are used in connection with a coherent pulse Doppler radar system, such as those described in French patent application no. 1,563,015.

I claim:

1. A continuous wave radar responder for receiving a frequency and amplitude-modulated carrier signal, said responder comprising:
   a. aerial means for receiving and retransmitting the carrier signal;
   b. means for effecting sampling of the received carrier signal at a frequency which is at least double the amplitude-modulation frequency;
   c. an amplifier for amplifying the samples of the received carrier signal;

d. a delay line for delaying the samples of the received carrier signal;
e. a first multi-position switch connected to the amplifier input; and
f. a second multi-position switch connected to the amplifier output;

said means for effecting sampling of the received carrier signal controlling the operation of said first and second switches such that they sequentially interconnect the aerial means, the amplifier, and the delay line to effect passage of each sample of the received signal through the amplifier, then through the delay line, and then through the amplifier again before retransmission.

2. A radar responder as in claim 1, wherein said aerial means comprises a receiving aerial and a transmitting aerial.

3. A radar responder as in claim 1, wherein said aerial means comprises a single receiving-transmitting aerial and a third switch for alternately connecting the aerial to the first and second switch under the control of the means for effecting sampling of the received carrier signal.

4. A radar responder as in claim 1, 2, or 3, wherein said sequential interconnections for each sample of the received carrier signal comprise:
a. a first phase during which the aerial means for receiving the carrier signal is connected to the delay line via the amplifier, effecting passage of the sample through the amplifier a first time, said first phase having a duration which is shorter than the delay provided by said delay line; and
b. a second phase during which the delay line is connected to the aerial means for retransmitting the carrier signal, via the amplifier, effecting passage of the sample through the amplifier a second time, said second phase having a duration which is at least equal to the duration of the first phase.

5. A radar responder as in claim 2, wherein said sequential interconnections for each sample of the received carrier signal comprise:
a. a first phase during which the receiving aerial is connected to the delay line via the amplifier, effecting passage of the sample through the amplifier a first time, said first phase having a duration which is shorter than the delay provided by said delay line;
b. a second phase during which the amplifier is serially-connected with the delay line, effecting passage of the sample through the amplifier a second time, said second phase having a duration which is approximately equal to the delay provided by said delay line; and
c. a third phase during which the delay line is connected to the transmitting aerial via the amplifier, effecting passage of the sample through the amplifier a third time, said third phase having a duration which is approximately equal to the delay provided by said delay line.

6. A radar responder as in claim 3, wherein said sequential interconnections for each sample of the received carrier signal comprise:
a. a first phase during which the receiving-transmitting aerial is connected to the delay line via the amplifier, effecting passage of the sample through the amplifier a first time, said first phase having a duration which is shorter than the delay provided by said delay line;
b. a second phase during which the amplifier is serially-connected with the delay line, effecting passage of the sample through the amplifier a second time, said second phase having a duration which is approximately equal to the delay provided by said delay line; and
c. a third phase during which the delay line is connected to the receiving-transmitting aerial via the amplifier, effecting passage of the sample through the amplifier a third time, said third phase having a duration which is approximately equal to the delay provided by said delay line.

7. A radar responder as in claim 4, wherein a modulator is serially connected with the delay line.

8. A radar responder as in claim 1, 2, 3, 5, or 6, wherein a modulator is connected between the second switch and the aerial means.

* * * * *